(12) United States Patent
Maistros, Jr.

(10) Patent No.: US 9,777,762 B2
(45) Date of Patent: Oct. 3, 2017

(54) SPRING BOLT ASSEMBLY APPARATUS AND METHODS OF USE AND MANUFACTURE THEREOF

(71) Applicant: Honda Motor Co., Ltd., Tokyo (JP)

(72) Inventor: Paul M. Maistros, Jr., Florence, SC (US)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 14/552,262

(22) Filed: Nov. 24, 2014

(65) Prior Publication Data

US 2016/0146240 A1    May 26, 2016

(51) Int. Cl.
*F16B 23/00*    (2006.01)
*F16B 41/00*    (2006.01)

(52) U.S. Cl.
CPC ................................. *F16B 41/002* (2013.01)

(58) Field of Classification Search
CPC ......... Y10T 29/53843; Y10T 29/53909; Y10T 29/53943; Y10T 29/53952; Y10T 29/53987; Y10T 29/53796; Y10T 29/53657; Y10T 29/53961; Y10T 29/53
USPC .......... 29/255; 269/3, 6, 119, 120, 240, 243, 269/244, 246, 249; 254/10.5; 411/349
See application file for complete search history.

(56) References Cited

U.S. PATENT DOCUMENTS

| 2,566,460 | A | * | 9/1951 | Mihalic | B25B 27/26 29/215 |
| 5,042,888 | A | * | 8/1991 | Shinjo | F16B 13/0858 411/44 |
| 5,190,308 | A | * | 3/1993 | Couturet | B62L 1/00 280/281.1 |
| 5,444,603 | A | | 8/1995 | Otsuka et al. | |
| 5,592,726 | A | * | 1/1997 | Suresh | B21D 39/04 29/237 |
| 8,453,412 | B2 | * | 6/2013 | Toedte | E04B 1/415 52/166 |
| 2005/0109167 | A1 | | 5/2005 | Ainsworth | |

* cited by examiner

*Primary Examiner* — Larry E Waggle, Jr.
*Assistant Examiner* — Henry Hong
(74) *Attorney, Agent, or Firm* — Kenealy Vaidya LLP (57) ABSTRACT

Some embodiments are directed to an apparatus for facilitating manual connection of a spring bolt assembly to a mounting structure. A handle is connected to a bolt holder. The bolt holder can define a proximal section adjacent the handle, a spring support, a front concavity disposed between the spring support and the proximal section, and a rear concavity disposed distally relative to the spring support. The front concavity can be configured to retain a bolt head and a washer of the spring bolt assembly. The spring support can be configured and disposed to retain a spring of the spring bolt assembly. A retainer can be disposed at a distal end of the bolt holder, and can be configured to contact the mounting structure so as to retain the mounting structure within the rear concavity, while also facilitating attachment of a nut to a distal end of the bolt shaft.

16 Claims, 6 Drawing Sheets

SPRING BOLT ASSEMBLY APPARATUS AND METHODS OF USE AND MANUFACTURE THEREOF

BACKGROUND

The disclosed subject matter relates to methods and apparatus for facilitating installation of a spring bolt assembly to another component. More particularly, the disclosed subject matter relates to apparatus for facilitating attachment of a spring bolt to another component, methods of manufacturing this apparatus, and methods of attaching the spring bolt to the other component.

Bolts and nuts can be used to secure components together in a variety of applications. The bolts and nuts can form a bolted joint, which secures components together by virtue of a combination of the nut applying an axial clamping force, and a shank of the bolt acting as a dowel, pinning the joint against sideways shear forces. The bolts and nuts can include corresponding threads to facilitate this connection, however some bolts define a plain unthreaded shank or shaft in order to provide a better dowel.

Spring bolt assemblies can also be used in certain circumstances to secure components together. Some of these assemblies include a spring that extends between a head of a bolt (and/or a washer disposed adjacent the bolt head) and a surface of a component to which the spring bolt assembly is secured. The spring provides a force that extends along a shank or shaft of the bolt, which enhances the frictional forces of corresponding bolt and nut threads, thereby enhancing the connection. Spring bolts can also be used to provide non-rigid connections between components by virtue of the spring's elasticity.

SUMMARY

However, spring bolt assemblies may be relatively complicated or difficult to install at least in part because their installation requires that multiple operations be performed at the same time. For example, during installation, a user compresses the spring while adding the nut to the compressed spring bolt assembly. Performing these operations, such as concurrently, may be difficult in a number of respects, such as by requiring: 1) a certain level of dexterity; 2) concurrent application of multiple forces to perform different operations, i.e., a force to compress the spring and a force to add the nut; 3) continued application of a relatively significant force to compress the spring for an extended period, etc.

The impact of these difficulties may be increased under certain circumstances. For example, installing multiple spring bolt assemblies and the resulting requirement to apply the above forces over a relatively extended period may result in fatigue. Various circumstances may require a user to install multiple spring bolt assemblies, such as in the context of a manufacturing facility. For example, a factory worker and/or other employee may be required to continuously install spring bolt assemblies during working hours, such as on an assembly line, resulting in fatigue to the user's hands, fingers, etc. The resulting fatigue may be problematic for various reasons, such as by causing user discomfort, increased difficulty to perform installations, increased risk to safety, etc.

This type of continuous assembly may occur in the manufacturing of various articles, such as vehicles, including but not limited to any type of automobile, including a passenger car, minivan, truck, other types of all-terrain vehicle (ATV), semi-tractor, off-highway vehicle, etc. These issues may also arise during the manufacture of other types of vehicles, such as aircraft, boats, ships, trains, spacecraft, etc. However, these issues may arise in non-vehicular applications, such as for amusement park rides, playground apparatus, etc.

It may therefore be beneficial to provide methods and apparatus that address at least one of the difficulties disclosed above with regard to installing spring bolt assemblies. For example, it may be beneficial to reduce or otherwise address: 1) the level of dexterity required; 2) the burden on the user to concurrently apply multiple forces to perform different operations, i.e., a force to compress the spring and a force to add the nut; and/or 3) the burden on the user to continually apply a relatively significant force to compress the spring for an extended period. Some of the disclosed embodiments reduce or remove the amount of force that needs to be applied to manually compress the spring, and/or reduce the amount of time that this force needs to be applied. In some of these and/or other embodiments, forces that need to be applied by a user's hands and/or fingers are reduced while the assembly and nut installation is performed.

Some embodiments are therefore directed to an apparatus for facilitating manual connection of a spring bolt assembly to a mounting structure using a user's hand. The spring bolt assembly can include a washer, a spring, a nut and a bolt that has a bolt head and a bolt shaft. The apparatus can include a handle configured to be grasped by the user's hand, and a bolt holder connected to the handle. The bolt holder can define a proximal section adjacent the handle, a spring support, a front concavity disposed between the spring support and the proximal section, and a rear concavity disposed distally relative to the spring support. The front concavity can be configured to retain the bolt head and the washer therein. The spring support can be configured and disposed to retain the spring. A retainer can be disposed at a distal end of the bolt holder. The retainer can be configured to contact the mounting structure so as to retain the mounting structure within the rear concavity, while also facilitating attachment of the nut to a distal end of the bolt shaft.

Some other embodiments are directed to an apparatus for facilitating manual connection of a spring bolt assembly to a mounting structure using a user's hand. The spring bolt assembly can include a washer, a spring, a nut and a bolt that has a bolt head and a bolt shaft. The apparatus can include a bolt holder that defines a proximal section adjacent the handle, a spring support, a front concavity disposed between the spring support and the proximal section, and a rear concavity disposed distally relative to the spring support. The front concavity can be configured to retain the bolt head and the washer therein. The spring support can be configured and disposed to retain the spring. A retainer can be disposed at a distal end of the bolt holder. The retainer can be configured to contact the mounting structure so as to retain the mounting structure within the rear concavity, while also facilitating attachment of the nut to a distal end of the bolt shaft.

Still other embodiments are directed to a method of manufacturing an apparatus for facilitating manual connection of a spring bolt assembly to a mounting structure using a user's hand. The spring bolt assembly can include a washer, a spring, a nut and a bolt that has a bolt head and a bolt shaft. The method can include: configuring a handle to be grasped by the user's hand; connecting a bolt holder to the handle; forming the bolt holder so as to include a proximal section adjacent the handle, a spring support, a front concavity disposed between the spring support and the proximal section, and a rear concavity disposed distally relative to the spring support; configuring the front concavity so as to retain the bolt head and the washer therein; disposing the spring support so as to retain the spring; disposing a retainer at a distal end of the bolt holder; and configuring the retainer so as to contact the mounting structure and thereby retain the mounting structure within the rear concavity, while also facilitating attachment of the nut to a distal end of the bolt shaft.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Spring Bolt Assembly

Figure 1:
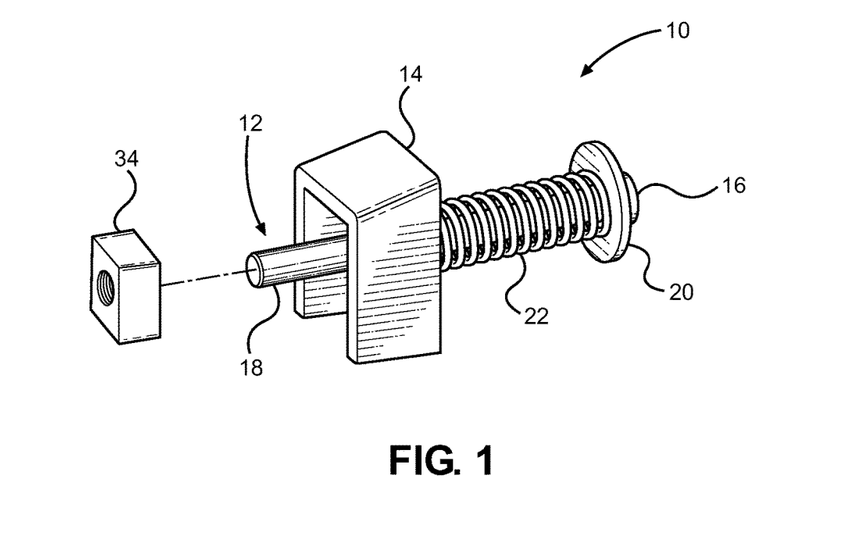
FIG. 1 is a perspective view of an exemplary spring bolt assembly in accordance with the present disclosure.

FIG. 1 is a perspective view of an exemplary spring bolt assembly 10 in accordance with the present disclosure. FIG. 1 shows the exemplary spring bolt assembly 10 in the process of being attached to an exemplary mounting structure 14.

As shown in FIG. 1, the spring bolt assembly 10 includes a bolt 12, spring 22, washer 20, and nut 34. The bolt 12 includes a bolt shaft 18 and a bolt head 16 disposed at one end of the bolt shaft 18. The bolt head 16 defines a cross-section that is larger than a cross-section of the bolt shaft 18. The bolt shaft 18 extends through a hole defined in the mounting structure 14.

Embodiments are intended to include or otherwise cover any type of bolt 12. For example, bolts can be used with any type of bolt head, including but not limited to bolt heads defining cross-sections in the shape of a square, rectangle, circle, hexagon, etc. Some of these bolt heads are configured to be held in place as the nut 34 is tightened. For example, bolt heads defining non-circular cross-sections may be held in place by any of various tools that grip the bolt head's exterior surface(s), such as a wrench, socket, pliers, etc. However, all of the bolt heads disclosed above, including the bolt heads defining circular cross-sections, can include other structures that enable them to be held in place, such as grooves or other formations for communicating with any type of screwdriver. As discussed in more detail below, some embodiments include a head engagement device 32 to hold the bolt head 16.

The bolts disclosed above are merely provided for exemplary purposes, and are not intended to be limiting. For example, in some embodiments, the bolt head may be smaller than the bolt shaft.

In the embodiment shown in FIG. 1, the bolt shaft 18 is shown as defining a circular cross-section. However, embodiments are intended to include or otherwise cover other types and shapes of bolt shafts, including bolt shafts defining non-circular cross-sections.

The spring bolt assembly 10 shown in FIG. 1 includes a washer 20 disposed adjacent the bolt head 16. The washer 20 defines a hole through which the bolt shaft 18 extends. The hole is disposed at a center of the washer 20, and thus the washer 20 is coaxial with the bolt shaft 18 and the bolt head 16. The washer 20 defines a cross-section having a diameter that is larger than the diameter of the bolt head 16 as well as a diameter of the coils of the spring 22.

The spring 22 is disposed around the bolt shaft 18, and extends between the washer 20 and the mounting structure 14. The spring 22 is held in place because the diameter of the coils of the spring 22 is smaller than the diameter of the washer 20 as well as the hole defined in the mounting structure 14 through which the bolt shaft 18 extends.

The nut 34 can be attached to the bolt shaft 18 via an end opposite to the bolt head 16. Embodiments are intended to include or otherwise cover any type of bolt shaft structure and nut that enables these elements to be connected together. For example, in some embodiments, the nut 34 defines a hole through which the bolt shaft 18 extends. The nut 34 surfaces defining the hole can include threads that communicate with threads defined at an exterior surface of the bolt shaft 18 to enable the nut 34 to be attached to the bolt shaft 18, and to provide resistance to removal therefrom.

The cross-section of the bolt 34 is larger than the diameter of the hole defined in the mounting structure 14 through which the bolt shaft 18 extends. Thus, attaching the nut 34 to the bolt shaft 18 enables the spring bolt assembly 10 to be secured to the mounting structure 14. Embodiments are intended to include or otherwise cover any type of nut 34, or any other structure, that performs this operation, i.e., that enables the spring bolt assembly 10 to be secured to the mounting structure 14.

Embodiments are intended to include or otherwise cover any type of mounting structure 14. In some embodiments, the mounting structure 14 constitutes an element or component that is to be mounted to another element or component. For example, in a vehicular application, the component 14 can constitute a headlamp assembly or boss for mounting to a portion of a vehicle, such as a vehicle body or frame. However, the disclosed apparatus and methods are applicable in other contexts, regardless of whether they involve vehicles.

II. Spring Bolt Assembly Apparatus

Figure 2:
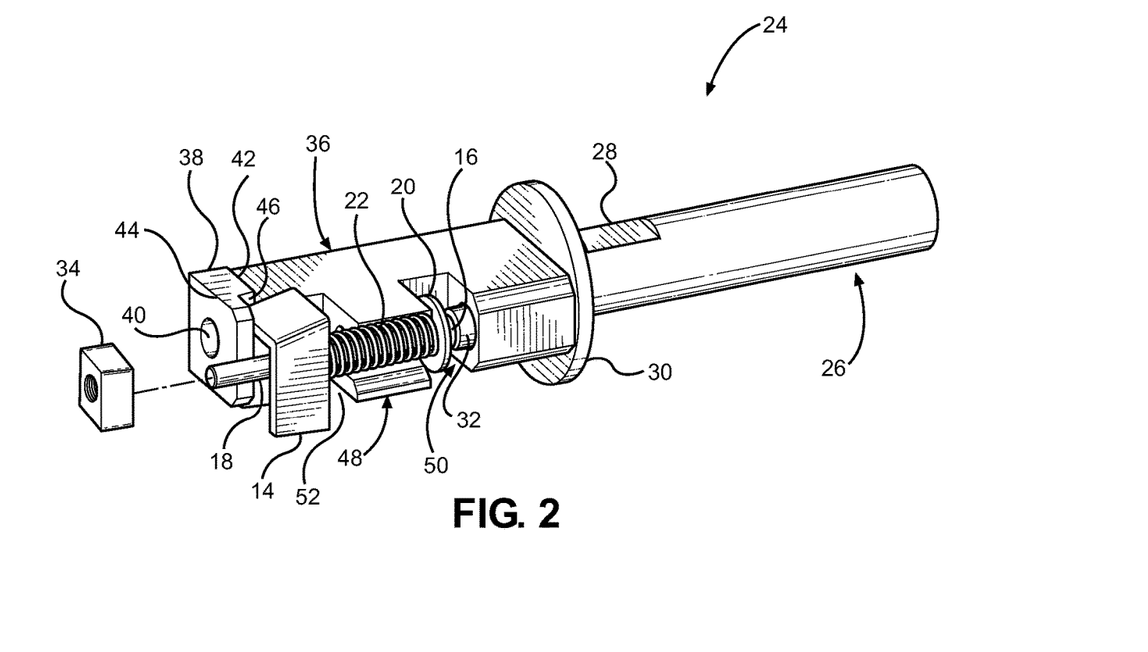
FIG. 2 is a perspective view of an exemplary spring bolt assembly apparatus cooperating with the spring bolt assembly of FIG. 1.

FIG. 2 is a perspective view of an exemplary spring bolt assembly apparatus 24 cooperating with the spring bolt assembly 10 of FIG. 1. As shown in FIG. 1, the spring bolt assembly apparatus 24 includes a handle 26, flange 30, bolt holder 36, and retainer 38. Each of these features is discussed in detail below.

The handle 26 is disposed at a proximal end of the spring bolt assembly 10 and is fitted to the flange 30 and bolt holder 36. The handle shown in FIG. 2 is primarily in the shape of a cylinder defining a circular cross-section. A recess 28 is defined in a portion of an outer surface of the handle 26. The handle 26 is sized and shaped to facilitate gripping with a user's hand. The recess 28 can be sized and shaped to enable engagement with part of the user's hand, such as one or more of the user's fingers, to enhance the ability of the user to grip the handle 26 and to perform the operations disclosed below.

However, embodiments are intended to include or otherwise cover handles having any structure, size, etc. For example, any type of handle can be provided that enables a user to grip the spring bolt assembly apparatus 10. In fact, the handle 26 can be disposed at any location other than at the proximal end of the spring bolt assembly apparatus 24 that still enables a user to grasp and hold the spring bolt assembly apparatus 24. For example, the handle 26 can be disposed at a bottom of the spring bolt assembly apparatus 24. In some of these embodiments, the handle 26 is grasped similarly to a pistol.

The flange 30 shown in FIG. 2 is in the form of a disc that defines a cross-section that is larger than the cross-section of the handle 26. In the embodiment of FIG. 2, the flange 30 is shaped to define a circular cross-section. The flange 30 is sandwiched between the handle 26 and the bolt holder 36.

The flange 30 is sized and shaped to abut against a portion of a user's hand that is engaged in grasping the handle 26. For example, a portion of a user's hand proximate the index finger and/or thumb can contact the flange 30, while the user grasps the handle 26, to enable the user to apply a force in the longitudinal direction of the spring bolt assembly apparatus 24 toward the retainer 38. As discussed in more detail below, manually applying a force in this direction enables or facilitates assembly.

The bolt holder 36 or jig is disposed between the flange 30 and the retainer 38. The bolt holder 36 is sized and shaped to retain the spring bolt assembly 10 (such as with the spring 22 in a compressed state) while the bolt 34 is attached to bolt shaft 18. Although the bolt holder 36 is shown in FIG. 2 in generally the shape of an "F" in side view, embodiments are intended to include or otherwise cover bolt holders having any shape that enables the above operation to be performed, i.e., to retain the spring bolt assembly 10 while the bolt 34 is attached to bolt shaft 18.

As shown in FIG. 2, the proximal end of the bold holder 36 is disposed adjacent the handle, and a front concavity 50 is defined between the proximal end and a spring support 48. The front concavity 50 is sized and shaped to enable reception therein of the bolt head 16 and the washer 20.

A head engagement device 32 can be connected to the bolt holder 36, and disposed to project within the front concavity 50. The head engagement device 32 can further be shaped and disposed to communicate with the bolt head 16 to hold the bolt 12 in place or otherwise stabilize the bolt 12.

In some embodiments, the head engagement device 32 is a rubber button. However, embodiments are intended to include or otherwise cover any type of head engagement device that is able to hold the bolt 12 in a relatively stationary orientation.

The front concavity 50 is configured and sized to enable the head engagement device 32, bolt head 16 and washer 20 to be disposed therein. The front concavity 50 can be further configured and sized so that the head engagement device 32, bolt head 16 and washer 20 are in contact, with the washer 20 contacting a portion of a rear or distal wall that defines the front concavity 50.

A spring support 48 is disposed adjacent the front concavity 50 in a rearward or distal direction. The spring support 48 is configured and sized to support and retain the spring 22 in a stable orientation.

The spring support 48 shown in FIG. 2 includes a pair of parallel arms that define a channel therebetween, such that the spring 22 is disposed within the channel. However, embodiments are intended to include or otherwise cover any type or configuration of spring support that enables the spring 22 to be retained in a stable orientation, i.e., prevents or impedes movement of the spring 22.

A rear concavity or opening 52 is defined adjacent the spring support 48 in a rearward or distal direction. The rear concavity 52 is configured and sized to enable the mounting structure 14 and a portion of the spring 22 to be disposed therein.

A retainer 38 is disposed at a distal end of the spring bolt assembly apparatus 24. The retainer 38 is configured and disposed to communicate with the mounting structure 14 to retain the mounting structure 14 within the rear concavity 52, while also providing space to enable a distal end of the bolt shaft 18 to freely extend such that the nut 34 can be attached thereto. Embodiments are intended to include or otherwise cover any type or configuration of retainer that enables this operation to be performed, i.e., that enables a distal end of the bolt shaft 18 to freely extend such that the nut 34 can be attached thereto.

In the embodiment shown in FIG. 2, the retainer 38 includes a front portion 42 and a unitarily formed rear portion 44. As viewed in top plan view, the front portion 42 has a lateral length that is shorter than a lateral length of the rear portion 44, such that a notch 46 is defined therebetween. The notch 46 is configured and sized such that a rear corner of the mounting structure 14 is disposed therein, which helps to hold the mounting structure 14 in place.

A. Bolt Holder

Figure 3:
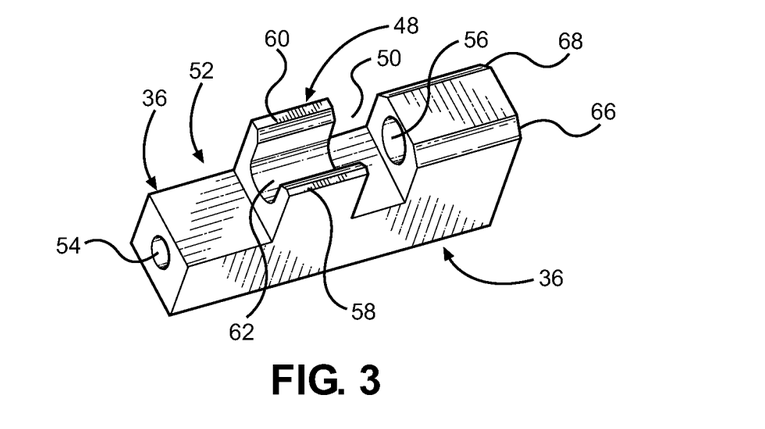
FIG. 3 is a perspective view of an exemplary bolt holder of the spring bolt assembly apparatus of FIG. 2.
Figure 4:
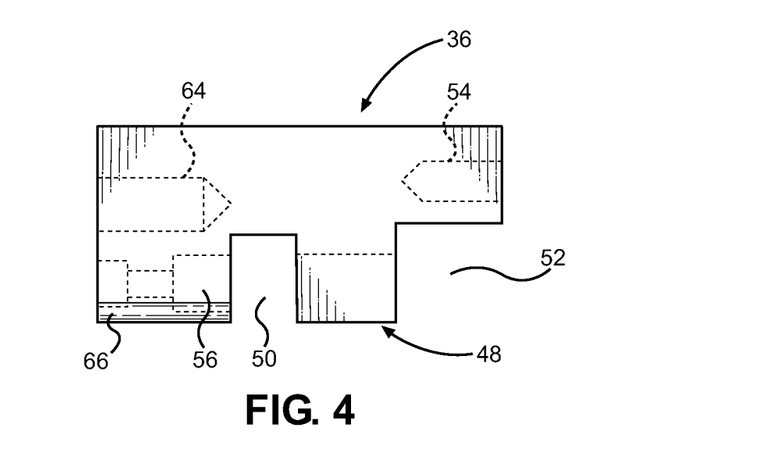
FIG. 4 is a side plan view of the bolt holder of FIG. 3.
Figure 5:
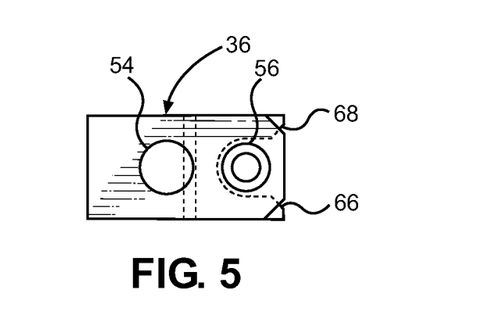
FIG. 5 is a rear plan view of the bolt holder of FIG. 3.
Figure 6:
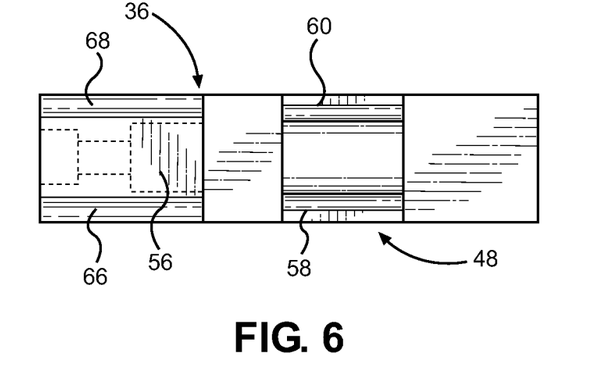
FIG. 6 is a top plan view of the bolt holder of FIG. 3.
Figure 7:
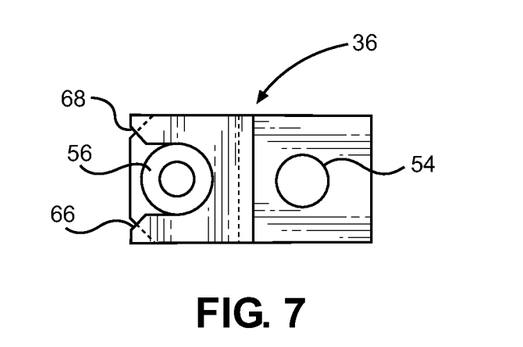
FIG. 7 is a front plan view of the bolt holder of FIG. 3.

FIG. 3 is a perspective view of an exemplary bolt holder of the spring bolt assembly apparatus of FIG. 2; FIG. 4 is a side plan view of the bolt holder of FIG. 3; FIG. 5 is a rear plan view of the bolt holder of FIG. 3; FIG. 6 is a top plan view of the bolt holder of FIG. 3; and FIG. 7 is a front plan view of the bolt holder of FIG. 3.

As shown in FIGS. 3 and 4, the proximal end of the bold holder 36 defines a mounting hole 56 that extends longitudinally from the front concavity 50. The head engagement device 32 is secured to the proximal end of the bold holder 36 by virtue of it being retained within the mounting hole 56. As disclosed above, the head engagement device 32 protrudes into the front concavity 50 for the purpose of engaging with the bolt head 16. This engagement may be beneficial by securing or otherwise stabilizing the bolt 12.

Embodiments are intended to include or otherwise cover any methods or apparatus for retaining the head engagement device 32 within the mounting hole 56. For example, the head engagement device 32 and the mounting hole 56 can be sized and shaped such that the head engagement device 32 is retained within the mounting hole 56 via a press or friction fitting. This press or friction fitting may be enhanced by manufacturing the head engagement device 32 and the proximal end of the bolt holder 36 that defines the mounting hole 56 from certain materials. For example, the head engagement device 32 may be formed from rubber or other elastic material, while the proximal end of the bolt holder 36 may be formed of a more resilient material to facilitate retention of the head engagement device 32. Alternatively, the head engagement device 32 may be retained within the mounting hole 56 via any other known, related art, or later developed method or apparatus, such as glue or epoxy, mechanical fasteners, etc.

The proximal end of the bolt holder 36 may include or define any other features that may be beneficial. For example, in the embodiment shown in FIGS. 3 and 5-7, corners of the proximal end of the bolt holder 36 define bevels 66 and 68. These bevels 66 and 68 may be provided for any purpose, such as to enhance the aesthetic appearance of the spring bolt assembly apparatus 24. However, the bevels 66 and 68 may be functional, such as to prevent the proximal end of the bolt holder 36 from projecting beyond the circumferential periphery of the flange 30. Configuring the proximal end of the bolt holder 36 to only extend within the circumferential periphery of the flange 30 may be beneficial for a variety of reasons, such as to ensure that the front portion of the user's hand only contacts the rounded and/or flat surfaces of the flange 30. In other words, the bevels 66 and 68 prevent the user's hand from contacting a portion of the proximal end of the bolt holder 36 that would otherwise be a sharp corner.

As shown in FIGS. 3 and 4, the spring support 48 includes engagement arms 58 and 60 that define a channel 62 therebetween. The channel 62 may be configured and sized to correspond to the exterior of the spring 22 to facilitate retention, stabilization, etc., of the spring 22 retained therein, which may be especially beneficial during compression of the spring 22. In the embodiment shown in FIG. 3, the engagement arms 58 and 60 define curved surfaces that correspond to curvatures of the exterior surface of the spring 22.

The channel 62 may also be configured such that its diameter is smaller than a diameter of the washer 20. Thus, a distal surface of the washer 20 abuts a proximal surface of each of the engagement arms 58 and 60.

In the embodiment shown in FIG. 3, the engagement arms 58 and 60 generally project in a direction that is perpendicular to the longitudinal direction of the spring bolt assembly apparatus 24 and define a generally U-shaped configuration. This U-shaped configuration is beneficial because it is open at one end, thereby enabling entry of the spring 22 into the channel 62. However, embodiments are intended to include or otherwise cover any other structure or configuration to retain or otherwise stabilize the spring 22, which as indicated above may be especially beneficial during compression. For example, the engagement arms 58 and 60 may be shorter or longer in either the longitudinal or lateral directions.

As shown in FIG. 4, the proximal end of the bolt holder 36 defines a mounting hole 64 for enabling attachment to the handle 26. For example, as explained in more detail below with regard to FIGS. 12-15, the handle 26 includes a projection 80 that extends within the mounting hole 64 to enable the handle 26 to be attached to the bolt holder 36.

As similarly shown in FIGS. 3 and 4, the distal end of the bolt holder 36 also defines a mounting hole 54 for enabling attachment to the retainer 38. As explained in more detail below with regard to FIGS. 8-11, the retainer 38 defines an offset mounting hole 40 that may be oriented to be contiguous or otherwise aligned with the mounting hole 54 to enable a projecting mechanism, such as a pin, bolt, etc., to attach the retainer 38 to the distal end of the bolt holder 36.

FIGS. 5-7 provide other views of the elements of the bolt holder 36 disclosed above. For example, these views show the mounting holes 54 and 56, bevels 66 and 68, and engagement arms 58 and 60. However, as indicated above, all of these features are merely provided for exemplary purposes, and alternative and/or additional structures may be used to perform some or all of the operations disclosed above.

B. Retainer

Figure 8:
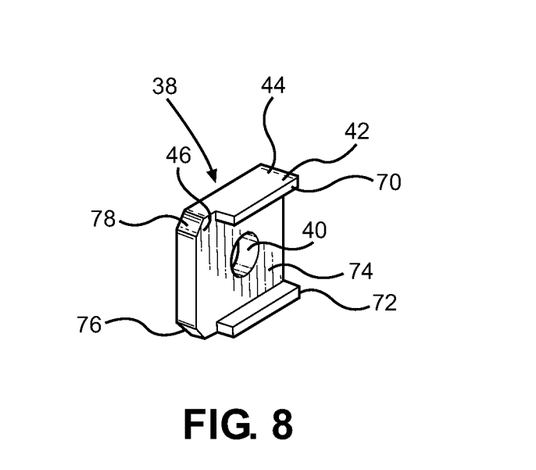
FIG. 8 is a perspective view of an exemplary retainer of the spring bolt assembly apparatus of FIG. 2.
Figure 9:
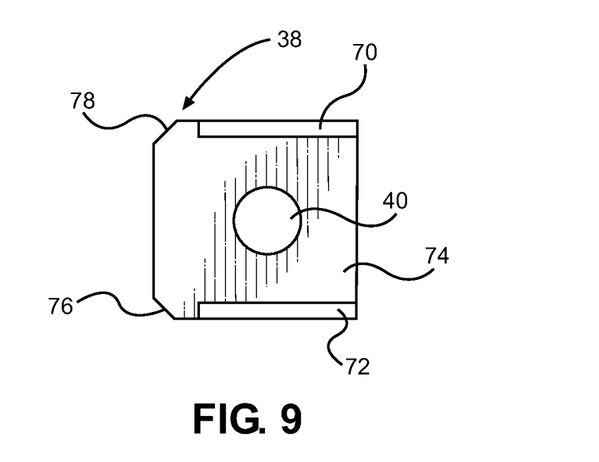
FIG. 9 is a front plan view of the retainer of FIG. 8.
Figure 10:
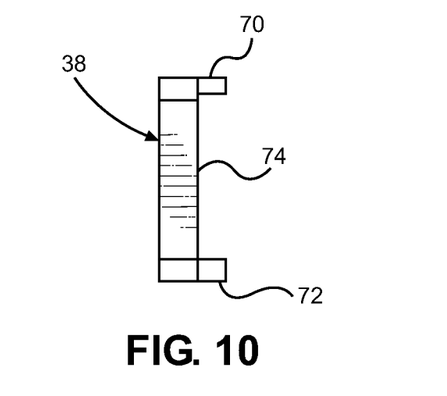
FIG. 10 is a plan view of one side of the retainer of FIG. 8.
Figure 11:
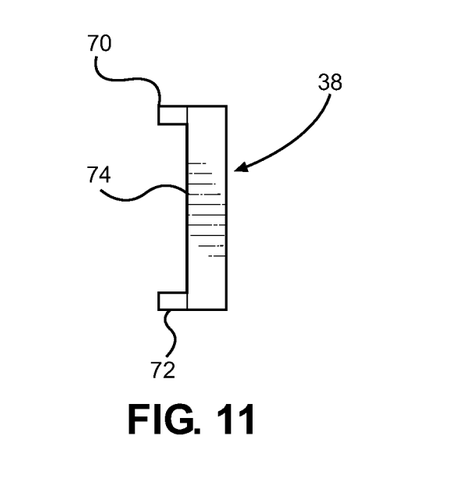
FIG. 11 is a plan view of another side of the retainer of FIG. 8.

FIG. 8 is a perspective view of an exemplary retainer of the spring bolt assembly apparatus of FIG. 2; FIG. 9 is a front plan view of the retainer of FIG. 8; FIG. 10 is a plan view of one side of the retainer of FIG. 8; and FIG. 11 is a plan view of another side of the retainer of FIG. 8.

As shown in FIG. 8, the retainer 38 includes a pair of arms 70 and 72 at opposite lateral sides that project from a recessed surface 74 in a direction perpendicular to the plane of the recessed surface 74. Each of the arms 70 and 72 defines the front portion 42 and rear portion 44 discussed above with regard to FIG. 2.

This configuration enables the arms 70 and 72 to extend along opposing exterior surfaces of the distal end of the bolt holder 36 in the longitudinal direction of the spring bolt assembly apparatus 24, which may be beneficial for various reasons. For example, this configuration enables or facilitates proper positioning and/or attachment of the retainer 38 at the distal end of the bolt holder 36. This proper positioning may be beneficial in order to properly align the offset mounting hole 40, which is shown in FIG. 8 as extending through the recessed surface 74 at an approximate center of the retainer 38, with the mounting hole 54 at the distal end of the bolt holder 36.

Embodiments are intended to include or otherwise cover any methods or apparatus for attaching the retainer 38 to the distal end of the bolt holder 36. For example as disclosed above, a projection may be provided to extend through both the offset mounting hole 40 of the retainer 38 and the mounting hole 54 at the distal end of the bolt holder 36. This projection may be in any form, such as a pin, bolt, clip, etc. It may be especially beneficial for this projection that facilitates connection between the retainer 38 and the distal end of the bolt holder 36 to enable the retainer to be adjusted in position along the longitudinal direction of the spring belt assembly apparatus 24.

This feature may be beneficial for various reasons, such as to facilitate insertion of the mounting structure 14, as well as other elements of the spring bolt assembly 10, onto the spring bolt assembly apparatus 24. For example, the retainer 38 can be moved away from the distal end of the bolt holder 36 to enable facilitate the mounting structure 14 to occupy the rear concavity 52. Once occupied, the retainer 38 can be moved toward the distal end of the bolt holder 36 to achieve a tight fit with the mounting structure 14.

As shown in FIG. 8, certain the edges of the retainer 38 may include bevels 76 and 78. The bevels 76 and 78 may be beneficial for various reasons. For example, the bevels 76 and 78 may enhance the aesthetic appearance of the spring bolt assembly apparatus 24. In addition, or as an alternative, the bevels 76 and 78 may enhance fitting of the spring bolt assembly apparatus 24 with the spring bolt assembly 10. The bevels 76 and 78 also prevent the user's hand from contacting a portion of the retainer 38 that would otherwise be a sharp corner.

FIGS. 9-11 provide other views of the elements of the retainer 38 disclosed above. For example, these views show the arms 70 and 72, recessed surface 74, offset mounting hole 40, and bevels 76 and 78. However, as indicated above, all of these features are merely provided for exemplary purposes, and alternative and/or additional structures may be used to perform some or all of the operations disclosed above.

C. Handle

Figure 12:
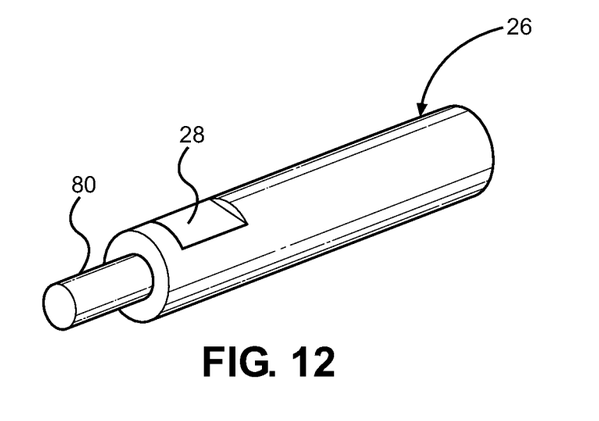
FIG. 12 is a perspective view of an exemplary handle of the spring bolt assembly apparatus of FIG. 2.
Figure 13:
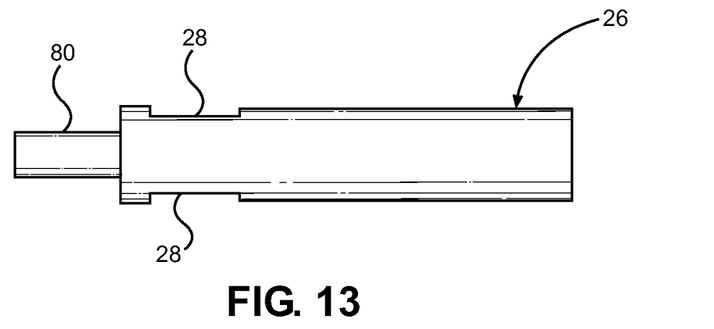
FIG. 13 is a plan view of one side of the handle of FIG. 12.
Figure 14:
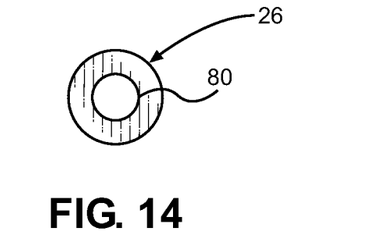
FIG. 14 is a front plan view of the handle of FIG. 12.
Figure 15:
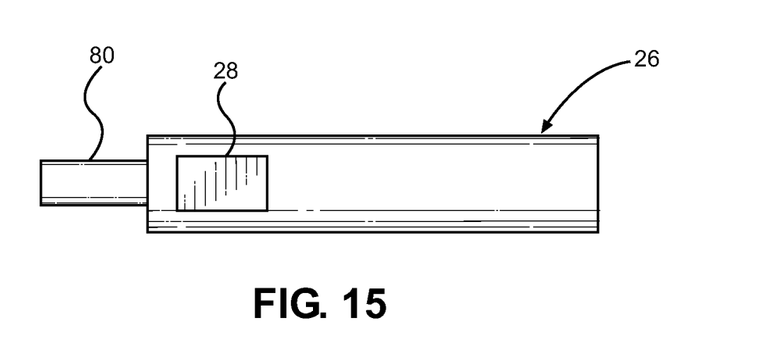
FIG. 15 is a plan view of another side of the handle of FIG. 12.

FIG. 12 is a perspective view of an exemplary handle of the spring bolt assembly apparatus of FIG. 2; FIG. 13 is a plan view of one side of the handle of FIG. 12; FIG. 14 is a front plan view of the handle of FIG. 12; and FIG. 15 is a plan view of another side of the handle of FIG. 12.

As shown in FIGS. 12 and 13, the handle 26 defines recesses 28 at circumferentially opposite sides of its exterior. The recesses 28 can be provided for various reasons, such as to enhancing a user's ability to grip the handle 26. Embodiments are intended to include or otherwise cover handles having any number, location or structure of recesses to facilitate gripping. In fact, some embodiments do not include any recesses, and include no additional structures to facilitate gripping. Contrarily, other such embodiments include other alternative structures to enhance gripping, such as projections.

However, still other structures can be added to any or all of the above embodiments to enhance gripping of the handle 26. For example, in accordance with some embodiments, some portions or all of the exterior surface of the handle 26 is structured to facilitate gripping. For example, the exterior surface of the handle 26 may be formed of a rough material to enhance gripping and/or impede slipping. Alternatively, or in addition to the above, the exterior surface of the handle 26 may be formed of a pliable or elastic material to enhance gripping.

As shown in FIGS. 12-15, the handle 26 includes a projection 80 that extends from the base in a longitudinal direction of the handle 26. The projection 80 is cylindrical with a circular cross-section. A diameter of the cross-section of the projection 80 is shorter than a diameter of the base of the handle 26. As discussed in more detail below, the projection 80 extends through an aperture 82 of the flange 30 and within the mounting hole 64 defined in the proximal end of the bolt holder 36. This structure enables the handle 26, flange 30 and bolt holder 36 to be connected together.

However, as indicated above, all of these features are merely provided for exemplary purposes, and alternative and/or additional structures may be used to perform some or all of the operations disclosed above. For example, the base and/or projection 80 of the handle 26 may be formed in any shape that facilitates the above operations, including shapes that define non-circular cross-sections.

D. Flange

Figure 16:
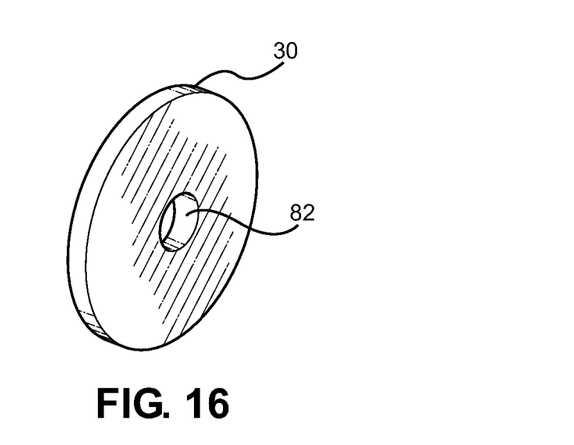
FIG. 16 is a perspective view of an exemplary flange of the spring bolt assembly apparatus of FIG. 2.
Figure 17:
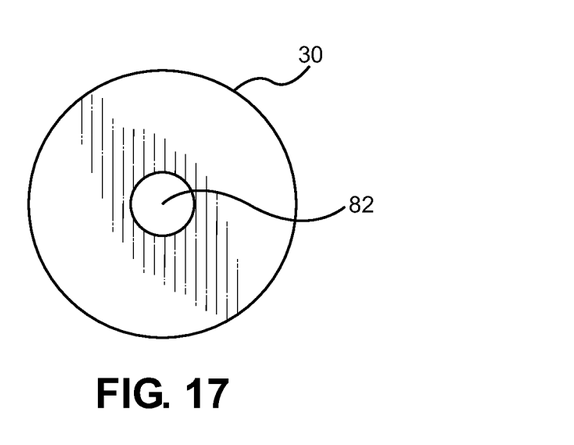
FIG. 17 is a front plan view of the flange of FIG. 16.

FIG. 16 is a perspective view of an exemplary flange of the spring bolt assembly apparatus of FIG. 2; FIG. 17 is a front plan view of the flange of FIG. 16; and FIG. 18 is a side plan view of the flange of FIG. 16.

Figure 18:
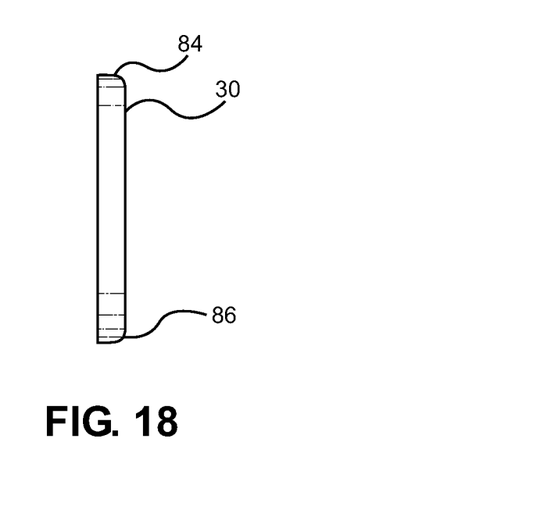
FIG. 18 is a side plan view of the flange of FIG. 16.

A shown in FIGS. 16-18, the flange 30 is shaped as a disc and defines an aperture 82 at approximately a center thereof. Front peripheral edges of the flange 30 include curved surfaces 84 and 86, which may be beneficial for various reasons. For example, the curved surfaces 84 and 86 may contact a front portion of the user's hand during operation and thereby facilitate comfort. In other words, the curved surfaces 84 and 86 may provide a more comfortable feel to the user than the sharp edges that a user's hand would otherwise contact.

As disclosed above, the projection 80 of the handle 26 extends through the aperture 82 of the flange and within the mounting hole 54 at the proximal end of the bolt holder 36. Embodiments are intended to include or otherwise cover any methods or apparatus for retaining the projection 80 within the mounting hole 54. For example, the projection 80 and the mounting hole 54 can be sized and shaped such that the projection 80 is retained within the mounting hole 54 via a press or friction fitting. This press or friction fitting may be enhanced by manufacturing the projection 80 and the proximal end of the bolt holder 36 that defines the mounting hole 54 from certain materials. For example, the projection 80 may be formed from rubber or other elastic material, while the proximal end of the bolt holder 36 may be formed of a more resilient material to facilitate retention of the projection 80. Alternatively, the projection 80 may be retained within the mounting hole 54 via any other known, related art, or later developed method or apparatus, such as glue or epoxy, mechanical fasteners, etc.

III. Operation

In accordance with the operation of some of the disclosed embodiments, a user inserts the spring bolt assembly 10 onto the spring bolt assembly apparatus 24. The spring bolt assembly 10 is oriented so that: 1) the bolt head 16 and washer 20 are disposed in the front concavity 50 of the spring bolt assembly apparatus 24, with the bolt head 16 in contact with the head engagement device 32; 2) at least a significant portion of the spring 22 is disposed in the channel 62 of the spring support 48; and 3) the mounting structure 14, and in some embodiments a portion of the distal end of the spring 22, are disposed in the rear concavity of the spring bolt assembly apparatus 24. The mounting structure 14 abuts against a portion of the recessed surface 74 adjacent the notch 46 of the retainer 38. In this orientation, a distal end of the bolt shaft 18 may extend distally beyond the retainer 38.

In this orientation, the spring bolt assembly apparatus 24 secures the spring bolt assembly 10 in place without further effort by the user. The user may grasp the handle 26 with one hand, and place the nut 34 at the distal end of the bolt shaft 18 with the user's other hand. The nut 34 can then be tightened with the other hand to achieve a desired tightness. The spring bolt assembly apparatus 24 provides leverage to compress the spring 22. In some embodiments, tightening the nut 34 compresses the spring 22.

This configuration is beneficial in a number of respects. For example, holding the spring bolt assembly 10 with the spring bolt assembly apparatus 24 as disclosed above obviates a user manually compressing the spring 22, and manually maintaining the spring 22 under compression while the nut 34 is tightened. More specifically, the spring bolt assembly apparatus 24 reduces the manual force required to compress the spring 22, and removes the forces on the user's hands while the assembly and nut installation is performed. In other words, the spring bolt assembly apparatus 24 performs the work that otherwise would be performed by a user's hands. Thus, this configuration reduces the amount of manual effort required to install the spring bolt assembly via the nut 34. The user's manual effort is further reduced by virtue of the handle 26, flange 30, etc., which further enhances the user's experience and further reduces fatigue, especially in the user's hands and fingers.

IV. Alternative Embodiments

While certain embodiments of the invention are described above, and FIGS. 1-18 disclose the best mode for practicing the various inventive aspects, it should be understood that the invention can be embodied and configured in many different ways without departing from the spirit and scope of the invention.

As indicated above, some of the embodiments are directed to vehicular manufacturing applications. For example, the above embodiments can be used to facilitate installation of a headlamp assembly or boss to another vehicular component, such as the frame, body, etc. However, embodiments are intended to be applied in any relevant context, such as to attach other vehicular components, or even in non-vehicular applications.

As disclosed above, the structure of some or all of the components disclosed above can be changed while still performing the functions disclosed above. For example, the flange 30 does not need to be provided in the shape of a circular disc, and instead can be formed in any shape that provides a surface for contacting a front portion of the user's hand. In fact, some embodiments do not include a flange 30.

Similarly, the spring support 48 does not need to be provided in the form of two parallel extending engagement arms 58 and 60 that define a channel 62 therebetween. Instead, the spring support 48 can be provided in any form that supports the spring 22. In fact, the configuration of the spring support 48 will change depending on the type, size, configuration, etc., of the spring that is used.

In addition, the retainer 38 does not need to be provided in the form disclosed in the figures, such as with separate arms 70 and 72 and a recessed surface 74. The retainer 38 can be provided in any form that contacts and holds in place the mounting structure 14.

Embodiments are also intended to include or otherwise cover methods of using and methods of manufacturing any or all of the elements disclosed above. Various aspects of these methods can be performed with or otherwise cover processors and computer programs implemented by processors.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. An apparatus for facilitating manual connection of a spring bolt assembly to a mounting structure using a user's hand, the spring bolt assembly including a washer, a spring, a nut and a bolt that has a bolt head and a bolt shaft, the apparatus comprising:
   a handle configured to be grasped by the user's hand;
   a bolt holder connected to the handle, the bolt holder defining a proximal section adjacent the handle, a spring support, a front concavity disposed between the spring support and the proximal section, and a rear concavity disposed distally relative to the spring support, the front concavity being configured to retain the bolt head and the washer therein, and the spring support being configured and disposed to retain the spring;
   a retainer disposed at a distal end of the bolt holder, the retainer being configured to contact the mounting structure so as to retain the mounting structure within the rear concavity, while also facilitating attachment of the nut to a distal end of the bolt shaft; and
   a flange disposed between the handle and the bolt holder, a cross-section of the flange having a larger diameter than a cross-section of the handle,
   wherein the handle defines a projection at its distal end, the flange defines a mounting hole that extends therethrough, and the proximal section of the bolt holder defines a mounting hole, the projection being configured to extend through the mounting hole of the flange and into the mounting hole of the proximal section of the bolt holder so as to resiliently attach the handle, flange and bolt holder together.

2. The apparatus according to claim 1, further including a head engagement device disposed within the front concavity and configured to communicate with the bolt head to hold the bolt in place.

3. The apparatus according to claim 2, wherein the head engagement device includes a rubber button, and a surface of the bolt holder that defines a proximal end of the front concavity includes a mounting hole that houses a portion of the rubber button.

4. The apparatus according to claim 1, wherein the spring support includes a pair of engagement arms that project in a direction that is perpendicular to a longitudinal direction of the bolt holder, and that define an open area therebetween that houses the spring.

5. The apparatus according to claim 4, wherein a diameter of the open area is smaller than an outer diameter of the washer, such that a distal surface of the washer abuts a proximal surface of each of the engagement arms.

6. An apparatus for facilitating manual connection of a spring bolt assembly to a mounting structure using a user's hand, the spring bolt assembly including a washer, a spring, a nut and a bolt that has a bolt head and a bolt shaft, the apparatus comprising:
   a handle configured to be grasped by the user's hand;
   a bolt holder connected to the handle, the bolt holder defining a proximal section adjacent the handle, a spring support, a front concavity disposed between the spring support and the proximal section, and a rear concavity disposed distally relative to the spring support, the front concavity being configured to retain the bolt head and the washer therein, the spring support being configured and disposed to retain the spring, the spring support defining an open area that is contiguous with the front and rear concavities so as to form a longitudinally extending channel herewith, the proximal section having a distally facing surface that intersects an axis of the channel and thereby form a proximal end boundary of the channel; and
   a retainer disposed at a distal end of the bolt holder, the retainer being configured to contact the mounting structure so as to retain the mounting structure within the rear concavity, while also facilitating attachment of the nut to a distal end of the bolt shaft, wherein the retainer includes a pair of parallel arms that project in a longitudinal direction of the bolt holder, and that are configured to extend over upper and lower planar surfaces of the bolt holder.

7. The apparatus according to claim 6, wherein the retainer defines a pair of notches, and the arms of the retainer define a recessed surface therebetween, the retainer being disposed such that a portion of recessed surface adjacent the notches contacts the mounting structure.

8. The apparatus according to claim 7, wherein the retainer is configured and disposed such that the distal end of the bolt shaft extends distally beyond a distal end of the retainer.

9. An apparatus for facilitating manual connection of a spring bolt assembly to a mounting structure using a user's hand, the spring bolt assembly including a washer, a spring, a nut and a bolt that has a bolt head and a bolt shaft, the apparatus comprising:
  a bolt holder that defines a proximal section, a spring support, a front concavity disposed between the spring support and the proximal section, and a rear concavity disposed distally relative to the spring support, the front concavity being configured to retain the bolt head and the washer therein, and the spring support being configured and disposed to retain the spring, the spring support including a pair of engagement arms that project in a direction that is perpendicular to a longitudinal direction of the bolt holder, and that define a channel therebetween that houses the spring; and
  a retainer disposed at a distal end of the bolt holder, the retainer being configured to contact the mounting structure so as to retain the mounting structure within the rear concavity, while also facilitating attachment of the nut to a distal end of the bolt shaft, the retainer including a pair of parallel arms that project in a longitudinal direction of the bolt holder, and that are configured to extend over upper and lower planar surfaces of the bolt holder.

10. The apparatus according to claim 9, further including a handle connected to the bolt holder and configured to be grasped by the user's hand, and a flange disposed between the handle and the bolt holder, a cross-section of the flange having a larger diameter than a cross-section of the handle.

11. The apparatus according to claim 10, wherein the handle defines a projection at its distal end, the flange defines a mounting hole that extends therethrough, and the proximal section of the bolt holder defines a mounting hole, the projection being configured to extend through the mounting hole of the flange and into the mounting hole of the proximal section of the bolt holder so as to resiliently attach the handle, flange and bolt holder together.

12. The apparatus according to claim 9, further including a head engagement device disposed within the front concavity and configured to communicate with the bolt head to hold the bolt in place.

13. The apparatus according to claim 12, wherein the head engagement device includes a rubber button, and a surface of the bolt holder that defines a proximal end of the front concavity includes a mounting hole that houses a portion of the rubber button.

14. The apparatus according to claim 9, wherein a diameter of the channel is smaller than an outer diameter of the washer, such that a distal surface of the washer abuts a proximal surface of each of the engagement arms.

15. The apparatus according to claim 9, wherein the retainer defines a pair of notches, and the arms of the retainer define a recessed surface therebetween, the retainer being disposed such that a portion of recessed surface adjacent the notches contacts the mounting structure, and the retainer is configured and disposed such that the distal end of the bolt shaft extends distally beyond a distal end of the retainer.

16. A method of manufacturing an apparatus for facilitating manual connection of a spring bolt assembly to a mounting structure using a user's hand, the spring bolt assembly including a washer, a spring, a nut and a bolt that has a bolt head and a bolt shaft, the method comprising:
  configuring a handle to be grasped by the user's hand;
  connecting a bolt holder to the handle;
  forming the bolt holder so as to include a proximal section adjacent the handle, a spring support, a front concavity disposed between the spring support and the proximal section, and a rear concavity disposed distally relative to the spring support;
  configuring the front concavity so as to retain the bolt head and the washer therein;
  disposing the spring support so as to retain the spring;
  disposing a retainer at a distal end of the bolt holder; and
  configuring the retainer so as to contact the mounting structure and thereby retain the mounting structure within the rear concavity, while also facilitating attachment of the nut to a distal end of the bolt shaft.

* * * * *